(12) United States Patent
Cao

(10) Patent No.: US 9,398,410 B2
(45) Date of Patent: Jul. 19, 2016

(54) LOCATION-BASED COMMUNICATIONS ACROSS TIME

(71) Applicant: STUBHUB, INC., San Francisco, CA (US)

(72) Inventor: Yang Cao, Shanghai (CN)

(73) Assignee: STUBHUB, INC., San Francisco, CA (US)

( * ) Notice: Subject to any disclaimer, the term of this patent is extended or adjusted under 35 U.S.C. 154(b) by 0 days.

(21) Appl. No.: 14/500,880

(22) Filed: Sep. 29, 2014

(65) Prior Publication Data

US 2016/0094943 A1 Mar. 31, 2016

(51) Int. Cl.
*H04M 1/66* (2006.01)
*H04W 24/00* (2009.01)
*H04W 4/02* (2009.01)
*H04L 29/08* (2006.01)

(52) U.S. Cl.
CPC .............. *H04W 4/021* (2013.01); *H04L 67/06* (2013.01)

(58) Field of Classification Search
CPC .............. G06F 17/30241; G06F 21/10; G06F 17/3089; H04W 4/02
USPC ............................. 455/411, 456.1, 456.3, 457
See application file for complete search history.

(56) References Cited

U.S. PATENT DOCUMENTS

| | | | | |
|---|---|---|---|---|
| 7,890,599 B2 * | 2/2011 | Kalmanje | .......... | H04N 7/17309 455/411 |
| 8,301,765 B2 * | 10/2012 | Goodman | .............. | G06Q 10/06 370/338 |
| 8,565,781 B2 * | 10/2013 | Nilsson | ...................... | 455/456.1 |
| 9,009,228 B2 * | 4/2015 | Horowitz | ............ | G06F 17/3089 709/204 |
| 2009/0029718 A1 * | 1/2009 | Nilsson | ............. | G06F 17/30241 455/456.1 |
| 2009/0187486 A1 * | 7/2009 | Lefenfeld | .......... | G06Q 30/0277 705/14.73 |
| 2012/0188147 A1 * | 7/2012 | Hosein | .............. | H04M 1/72519 345/2.2 |
| 2013/0174223 A1 * | 7/2013 | Dykeman | ............... | G06F 21/10 726/4 |
| 2014/0148203 A1 * | 5/2014 | Nilsson | ............. | G06F 17/30241 455/457 |
| 2014/0337697 A1 * | 11/2014 | Ryu | ........................ | H04L 67/10 715/205 |
| 2015/0268722 A1 * | 9/2015 | Wang | ...................... | G06F 3/016 345/156 |
| 2015/0289106 A1 * | 10/2015 | Forstall | ................... | H04W 4/02 455/456.3 |

* cited by examiner

*Primary Examiner* — William D Cumming
(74) *Attorney, Agent, or Firm* — Haynes and Boone, LLP

(57) ABSTRACT

A first user at a location creates content (e.g., a text, voice message, photograph, image, video, or other content) associated with the location and sends the content to a service provider server using a first user device. The service provider server stores the content for future visitors of the location to access. When a second user with a second user device is subsequently at or close to the location associated with the content, the service provider server provides access to the content based on a location of the second user device and one or more criteria, such as a search area criterion, time interval criterion, access area criterion, and/or user interest criterion. The second user may then view the content on the second user device.

19 Claims, 9 Drawing Sheets

LOCATION-BASED COMMUNICATIONS ACROSS TIME

BACKGROUND

1. Technical Field

The present disclosure relates generally to electronic communications, and more particularly, to communications across time based on location.

2. Related Art

Computer systems and networks have facilitated the tasks of communication and socialization among users. For example, global computer networks, such as the Internet, have allowed users to communicate with other users online via the networks. Similarly, global computer networks provide an efficient and cost-effective medium for service providers to provide electronic communication services.

A user may communicate with other users using a mobile device via a network. For example, the user may send text messages, voice messages, photographs, videos, or other media, directly to other users that they already know in a short-message-service (SMS), email, or social media communication. Users often want to find and communicate with other users with common interests. However, it may sometimes be difficult to locate or identify others with common interests.

DETAILED DESCRIPTION

Figure 1:
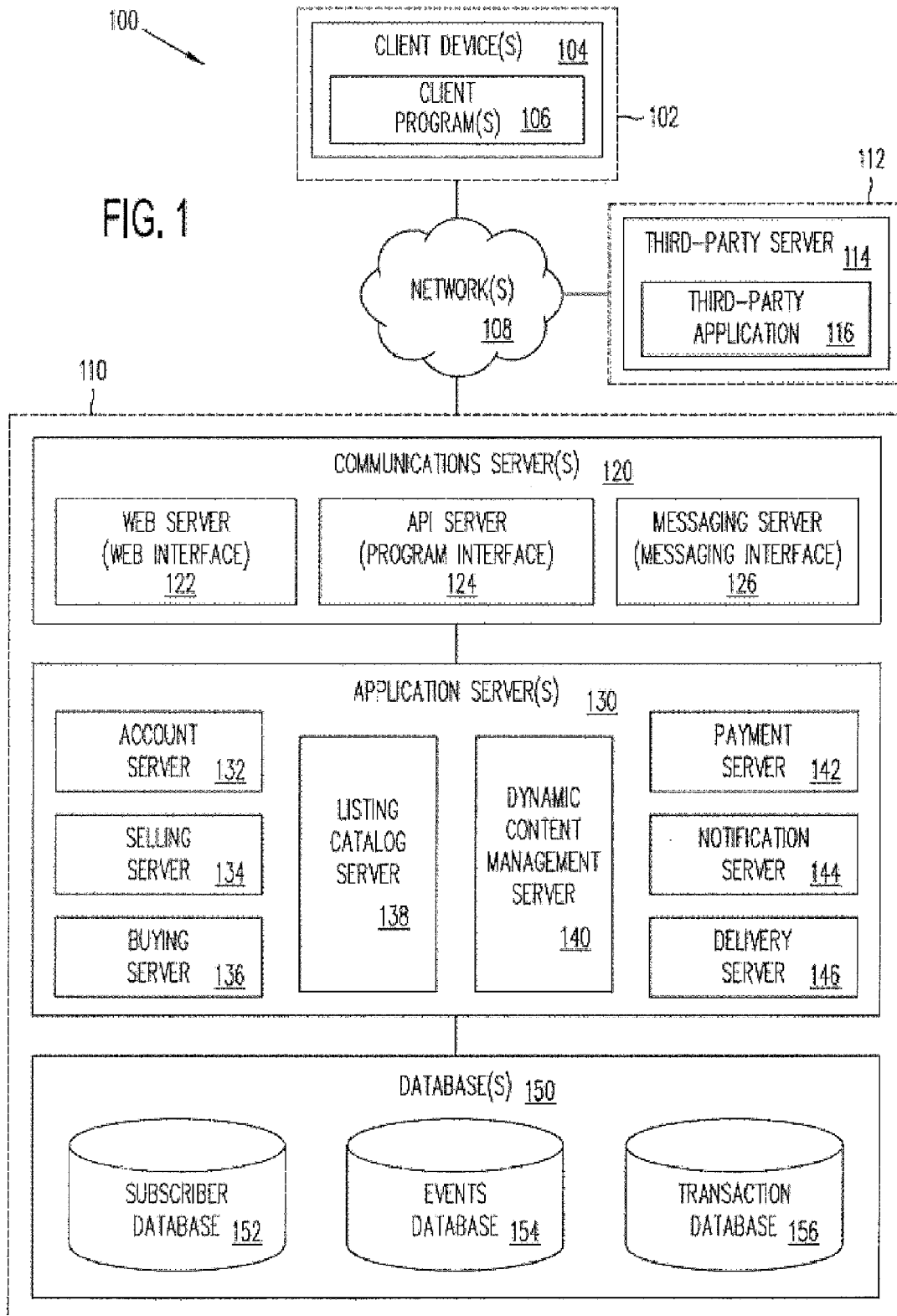
FIG. 1 is a block diagram of an illustrative computing system that is adapted for implementing location-based communication across time according to an embodiment.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

Devices, systems and methods are provided for electronic communication and social networking. In various particular embodiments, the devices, systems or methods can involve one or more devices in communication over a network. Such devices, systems, and methods can facilitate communicating across time based on location.

A first user may visit a location and may be interested in communicating with future visitors of the location. The location may be a stadium for sports games, a theater for performances, a building, a restaurant, or other venue. For example, the first user may want to communicate with future visitors because they share a common interest, particularly when the location is a place that draws people with certain interests (e.g., a stadium that draws fans of a sports team). In another example, the first user may want to communicate with future visitors to share information about the location (e.g., quality of food at a stand in a stadium).

In various embodiments, a first user creates content (e.g., a text, a voice message, a photograph, an image, a video, or other media content) at a location using a first mobile device. The content is associated with a location, such as a location where the content is created. The content may be associated with a time, such as a created time or a stored time. The first user may provide the content to a service provider server for storage and access by future visitors of the same or nearby location.

The location associated with the content may be based on a user location determined by the first mobile device. The first mobile device may use global positioning system (GPS), cellular signals, Wi-Fi signals, BLUETOOTH® Low Energy (BLUETOOTH® LE) signals, NFC signals, LTE Direct signals, or a combination thereof. The first mobile device may associate the user location to the content by geotagging the content, which adds geographical information as metadata to the content. The geographical identification may include latitude and longitude coordinates, altitude, distance, accuracy data, and/or place names.

The geographical identification of the content may range from broad to specific. For example, the location may include a stadium, a section within a stadium, a row within a section, or a seat within a section. In another example, the location may include a building, a floor within a building, or a room within a floor. However, this is merely illustrative. The location may be any location at which the user of the first mobile device wishes to geotag content for a future visitor to that location. The location associated with the content may be identified using one or more levels of specificity.

The time associated with the content may be based on timestamping by the first mobile device. The first mobile device may associate a time with the content by timestamping the content, which adds a timestamp as metadata to the content. The timestamps of the content may include, for example, a created time, an accessed time, a modified time, a saved time, an uploaded time, a downloaded time, etc.

In various embodiments, when a second user is subsequently at or close to a location associated with content that has been geotagged at that location, the second user uses a second mobile device to access and receive the content from the service provider server. The service provider server receives a location of the second user based on a user location determined by the second mobile device. The service provider server provides access to the content based on the location of the second user and/or one or more criteria. The criteria may relate to the location of the second user and the location, time, and access area associated with the content. For example, the service provider server may determine, based on the received location of the second user and one or more locations associated with stored content, that the second user is at or near the location of a first portion of the content. Based on the determination that the second user is at or near the location of the first portion of the stored content, the second user may be provided access to that first stored content. The second user may then view the first stored content on the second mobile device.

In another embodiment, content shared (or not shared) with the second user may be based on information about the first user and the second user, such as shared interests related to or independent of the event. For example, the first and second user may both be interested in wines (e.g., such as shown by search history, purchase history, social networks, self-entered interest, and the like). As such content from the first user may be shared with the second user, including an indication that the first user likes wine. This may prompt a discussion or a more focused discussion or communication between the two users. In another example, the first user may be a fan of a visiting team, while the second user is a fan of the home team. If the content associated with the first user is directed to a visiting team the second user has no interest in, content may not be shared. This enables the system to provide selective content so that the second user is only presented with content of interest to the second user.

The second user may respond to the first user by storing second content as a response or may respond directly to the first user. In an embodiment, when the first user or another user is subsequently at or nearby the location associated with the first stored content and the second content, the first user or the other user is able to view the response. In another embodiment, the response is communicated directly (e.g., delivered in real-time from device to device or through a server or network) to the first user, who receives a notification of the response and/or is able to view the response the next time a location-based storage application is opened. In this way, a connection between the first user and the second user may be established by which the first user and second user may be able to continue communications if desired.

A particular example will now be described in connection with attendees of sporting events at a stadium. This example is merely illustrative and is not intended to be limiting. In this particular example, a first user watches a sports game at a stadium. The first user creates content by, for example, capturing a photograph or video of the game from his or her seat on the day of the game (e.g., during the game), recording a voice message (e.g., "I sat in your seat in 2014, and I'm witnessing the team celebrating their championship victory right now! How is the team at your time?"), or typing a text message (e.g., "Don't buy the hotdog at the entrance, it tastes bad."). The first user provides the content, which is geotagged and timestamped, for storage on a service provider server using his or her mobile device. The first user may select the section, row, seat, or other location within the stadium as the area for accessing the content or the service provider server may determine the location for accessing the content based on the geotag of the content and/or other information (e.g., a seat location of a purchased ticket of the first user). For example, the first user may select the section as the area for accessing the content.

In this particular example, a second user subsequently watches a different sports game or a concert or other event at the same section in the stadium. The second user may be determined to be in the same section and, because the second user is in the same section, the second user may be provided access to the content information. The second user uses his or her mobile device to receive the content. The second user may then view the content. The second user may leave a response to the content for the first user and/or may leave additional content associated with the location for subsequent visitors to the location. The first user may view the response the next time he or she visits the stadium or may receive the response directly from the second user.

While the various examples disclosed herein focus on particular aspects regarding the online communication, it will be understood that the various inventive principles and embodiments disclosed herein can be applied to other types of communication applications and arrangements as well. For example, communications that is performed on a closed or proprietary computing system may utilize one or more of the aspects and features found in the various systems and methods provided.

Reference throughout the specification to "various embodiments," "some embodiments," "one embodiment," "an embodiment," "various examples," "one example," "an example," or "some examples" means that a particular feature, structure, or characteristic described in connection with the embodiment or example is included in at least one embodiment. Thus, appearances of these are not necessarily all referring to the same embodiment. Furthermore, the particular features, structures or characteristics may be combined in any suitable manner in one or more embodiments.

According to an embodiment, a computer program product can comprise a non-transitory machine readable medium. The non-transitory machine readable medium can have computer readable and executable code for instructing one or more processors to perform any of the methods disclosed herein.

Beginning with FIG. 1, an exemplary embodiment of a computing system adapted for implementing location-based communications across time is illustrated in block diagram format. As shown, a computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a client 102 that may comprise or employ one or more client devices 104, such as a laptop, a mobile computing device, a PC, a wearable device, and/or any other computing device having computing and/or communications capabilities in accordance with the described embodiments. In particular, it is specifically contemplated that client devices 104 can include a cellular telephone or other similar mobile device that a user can carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, SYMBIAN™ OS, EMBEDIX™ OS, Binary Run-time Environment for Wireless (BREW) OS, JAVA® OS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-of-interest, locator), and so forth. One or more of client programs 106 may display various graphical user interfaces (GUIs) to present information to and/or receive information from one or more of client devices 104.

As shown, client 102 can be communicatively coupled via one or more networks 108 to a network-based system 110. Network-based system 110 may be structured, arranged, and/or configured to allow client 102 to establish one or more communications sessions with network-based system 110 using various computing devices 104 and/or client programs 106. Accordingly, a communications session between client 102 and network-based system 110 (e.g., a communications session for a user to communicate with other users by transmitting and receiving content data) may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or voice communications between client 102 and the network-based system 110 may be sent and received over one or more networks 108 such as the Internet, a WAN, a WWAN, a WLAN, a mobile telephone network, a landline telephone network, a VoIP network, as well as other suitable networks. For example, client 102 may communicate with network-based system 110 over the Internet or other suitable WAN by sending and or receiving information via interaction with a web site, e-mail, IM session, and/or video messaging session. Any of a wide variety of suitable communication types between client 102 and system 110 can take place, as will be readily appreciated. In particular, wireless communications of any suitable form may take place between client 102 and system 110, such as that which often occurs in the case of mobile phones or other personal mobile devices.

In various embodiments, computing system 100 can include, among other elements, a third party 112, which may comprise or employ a third-party server 114 hosting a third-party application 116. In various implementations, third-party server 114 and/or third-party application 116 may host a web site associated with or employed by a third party 112. For example, third-party server 114 and/or third-party application 116 may enable network-based system 110 to provide client 102 with additional services and/or information, such as email services and/or information.

In one embodiment, third party server 112 may include an email server that hosts a user's email account. In some embodiments, one or more of client programs 106 may be used to access network-based system 110 via third party 112. For example, client 102 may use a web client to access and/or receive content from network-based system 110 after initially communicating with a third-party web site 112.

Network-based system 110 may comprise one or more communications servers 120 to provide suitable interfaces that enable communication using various modes of communication and/or via one or more networks 108. Communications servers 120 can include a web server 122, an API server 124, and/or a messaging server 126 to provide interfaces to one or more application servers 130. Application servers 130 of network-based system 110 may be structured, arranged, and/or configured to provide various online messaging, social networking, and other communications services to users that access network-based system 110. In various embodiments, client 102 may communicate with applications servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

Application servers 130 of network-based system 110 may be implemented as an online communications server that provides various online communications and social networking services including, for example, account services, listing catalog services, dynamic content management services, delivery services, content geotagging and timestamping services, and notification services. Application servers 130 may include an account server 132, a listing catalog server 138, a dynamic content management server 140, a notification server 144, and/or a delivery server 146 structured and arranged to provide such online communications and social networking services.

Application servers 130, in some embodiments, may further be implemented as an online ticket marketplace that provides various online marketplace and ticket fulfillment services including, for example, buying services, selling services, delivery services, and payment services. Application servers 130 may include a selling server 134, a buying server 136, a payment server 142, and/or a delivery server 146 structured and arranged to provide such online marketplace and ticket fulfillment services.

Application servers 130, in turn, may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
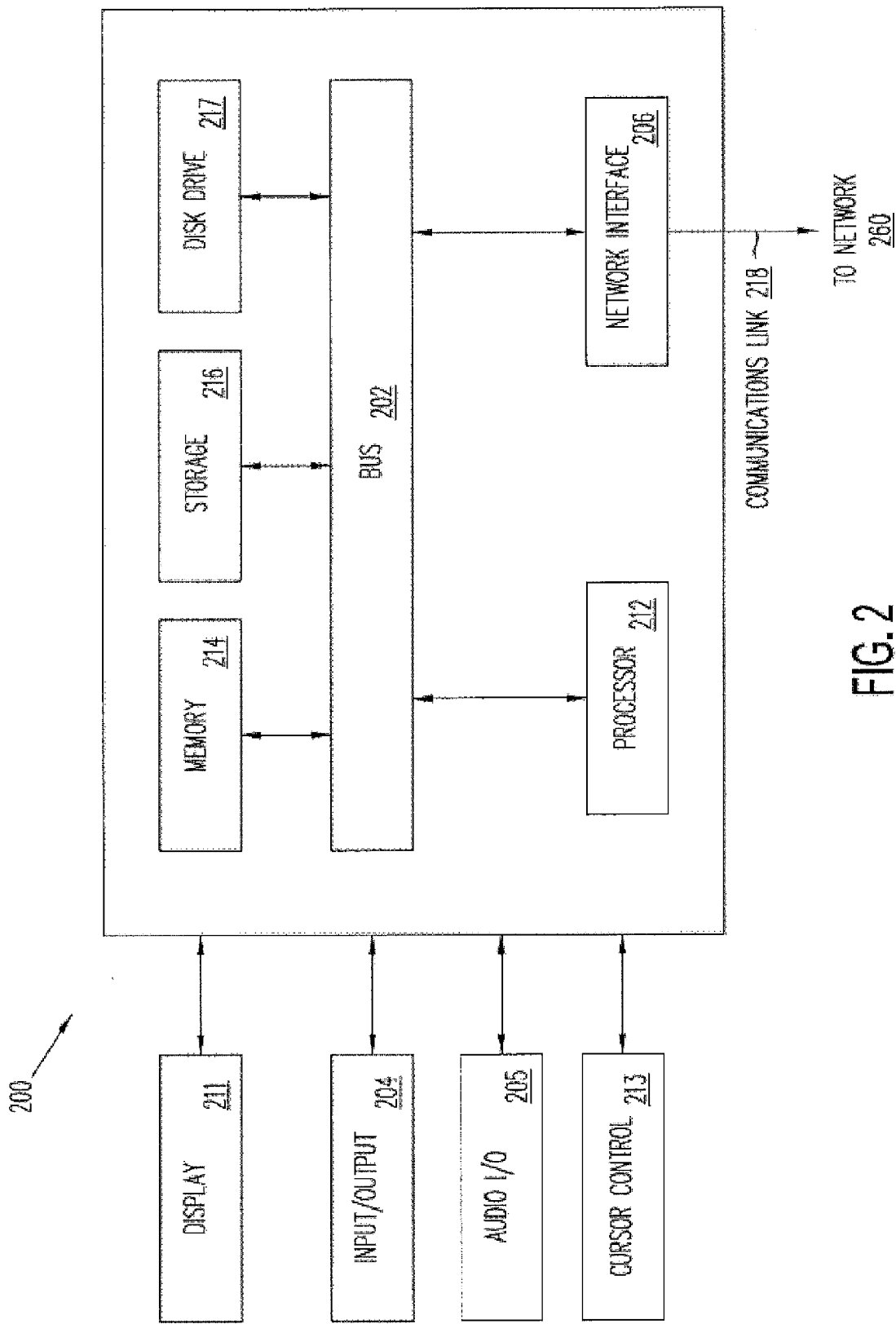
FIG. 2 is a block diagram of an illustrative computer system suitable for implementing on one or more devices of the computing system in FIG. 1 according to an embodiment.

Continuing with FIG. 2, an exemplary computer system 200 suitable for implementing on one or more devices of the computing system in FIG. 1 is depicted in block diagram format. In various implementations, a device that includes computer system 200 may comprise a personal computing device (e.g., a smart or mobile phone, a computing tablet, a personal computer, laptop, wearable device, PDA, BLUETOOTH® wireless technology device, key FOB, badge, etc.) that is capable of communicating with a network. A service provider and/or a payment provider may utilize a network computing device (e.g., a network server) capable of communicating with the network. It should be appreciated that each of the devices utilized by users, service providers, and payment providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, a venue server, an email server, a social networking server, other third-party servers, and/or a payment provider server via a network. In various embodiments, such as for many cellular telephone and other mobile device embodiments, this transmission can be wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Again, communication link 218 can simply be a wireless communication form in some embodiments. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory machine-readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into substeps to provide features described herein.

The foregoing networks, systems, devices, and numerous variations thereof can be used to implement a communication operation such as transmitting and receiving communications based on location, such as location-based communications across time.

Figure 3:
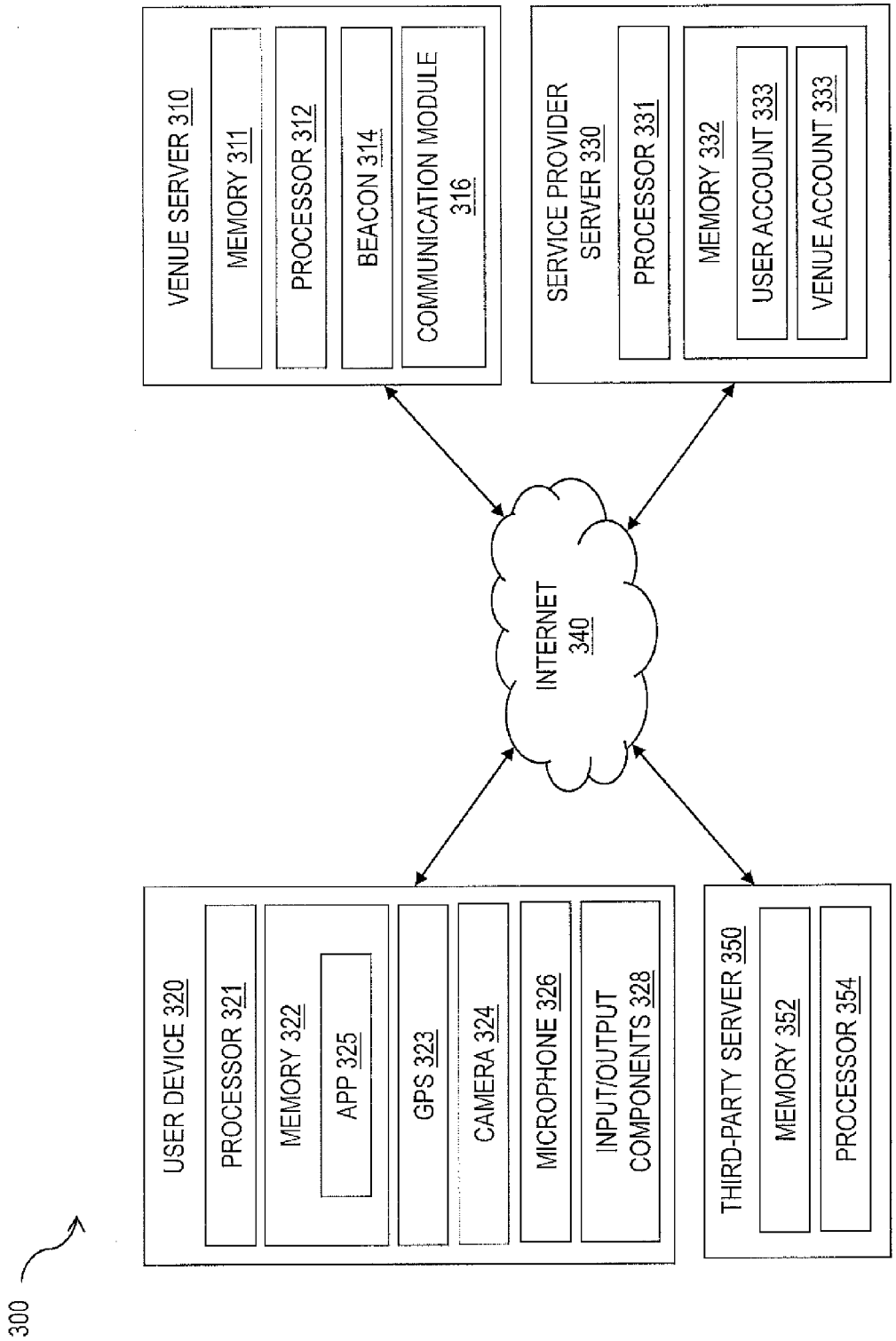
FIG. 3 is a block diagram of an illustrative system for location-based communication across time according to an embodiment.

FIG. 3 is a block diagram showing a communications system that may be used to receive content information associated with one or more locations from a first user and provide the content information to one or more second users when the one or more second users are at or near the one or more locations according to an embodiment. As shown in FIG. 3, a service provider server or device 330 may be in communication with one or more user devices such as a user device 320, one or more venue devices such as a venue device 310, and one or more third-party servers such as a third-party server 350.

In some embodiments, a venue device such as venue device 310 (sometimes referred to herein as a venue server or a venue system) can be present at each of a plurality of different venues (e.g., stadiums, theaters, arenas, amphitheaters, buildings, vacation spots, or other venues). Venue device 310 may provide information regarding user locations at the venue, for example, at a certain time or during a certain event. Venue device 310 may further provide other information, such as information regarding events at a particular venue and regarding seating and/or other accommodations at that venue. In some embodiments, venue device 310 can provide the information to service provider server 330. Service provider server 330 can receive information regarding user location, events at various venues, and seating and/or other accommodations at the various venues from venue device 310, from other sources, or service provider server 330 may have a database of user location information, event information, and venue information independent of any interaction with venue device 310. Service provider server 330 may, for example, be an implementation of system 110 of FIG. 1.

Venue device 310 can be a system that includes one or more computers, one or more servers, one or more computing tablets, one or more mobile devices, communications equipment, wireless transmitters or beacons and/or other suitable computing equipment, as examples. Venue device 310 can have processing circuitry such as a processor 312 and storage such as a memory 311. Venue device 310 may, according to some embodiments include one or more wireless beacons such as beacon 314 and communications equipment such as communications module 316.

Processor 312 can execute a software program stored in memory 311 for providing information regarding user locations at the venue, regarding events at the venue, regarding seating at the venue, and/or other information for each event. Venue device 310 can provide the information to service provider server 330 and/or to a user device such as user device 320.

A connection between user device 320 and wireless beacon 314 may be established with or without user input from a user. For example, wireless beacon 314 may broadcast a token, such as a universally unique identifier (UUID), for reception by user device 320. User device 320 may receive the token from wireless beacon 314 (e.g., when user device 320 is in proximity to beacon 314). If user device 320 acknowledges the UUID as identifying a known service or location, user device 320 may transmit an identifier corresponding to user device 320 back to wireless beacon 314. User device 320 may communicate with wireless beacon 314 using, as examples, near field communications signals, BLUETOOTH® signals, BLUETOOTH® Low Energy signals, radio signals, infrared signals, or other wireless communications signals. The identifier from user device 320 may include, be transmitted with, concatenated with, or otherwise bundled with the identifier received from wireless beacon 314.

Communication module 316 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, BLUETOOTH® wireless technology, and near field communication (NFC) devices. Wireless beacon 314 may utilize communications circuitry such as communication module 316 to communicate with service provider server 330 and/or user device 320. In various embodiments, wireless beacon 314 may be operated by the venue, by a service provider, or by another service such as a payment provider.

Venue device 310 can be disposed at the venue. However, this is merely illustrative. If desired, venue device 310 can be disposed at a location other than the venue. Each venue can have a dedicated venue device 310 or a plurality of different venues can share a common venue device 310. For example, co-owned venues can share a common venue device 310.

In some embodiments, venue device 310 can be omitted if service provider server 330 has the information needed for determining user locations. For example, service provider server 330 may receive user location from user device 320 that enables service provider server 330 to provide communication based on the location. In an embodiment, service provider server 330 may receive a user location from user device 320 to determine user location to a certain level of specificity, such as a within section within a venue, and optionally receive additional user location information from venue device 310, when available, to determine a more specific location, such as a row or a seat or other area within the venue.

Third party servers such as third-party server 350 may include, for example, an email server that hosts email services (e.g., an email account for the user) or a social networking server. A user may use user device 320 to access services hosted by one of third-party servers 350, such as sending, storing, and receiving emails or other electronic communications on an email account.

Service provider server 330 may obtain user location information from third-party servers 350, for example, by scraping emails in an email account that is hosted by a third-party server 350. For example, service provider server 330 may determine from the user's email that the user purchased a ticket in a particular section, row, and seat at the venue and may determine, in combination with real time location information for the user device of the user and/or one or more wireless beacons at the venue, that the user is at that seat, row, and section. However, this is merely illustrative. If desired, the location information for geotagging content from the user may be determined without additional third party or other information and/or service provider server 330 can gather and store location information directly from users of service provider server 330 (e.g., users who have previously purchased tickets using service provider server 330 where service provider server 330 provides ticket fulfillment services).

Third-party server 350 can be a computer, a server, a computing tablet, or a mobile device, as examples. Server 350 can have processing circuitry such as a processor 354 and storage such as a memory 352.

A processor 354 on third-party server 350 can execute one or more software programs stored in memory 352 for storing and routing emails or other communications such as social networking communications for the user. In one embodiment, third party server 350 can be omitted if service provider server 330 has the information needed for determining user locations at the venue. For example, service provider server 330 may have a database of user device information and/or purchases gathered from user device 320 that helps determine the user location.

In certain embodiments, service provider server 330 may receive a user location from user device 320 via a location API. The user device 320 may utilize GPS, cellular signals, Wi-Fi signals, BLUETOOTH® Low Energy (BLUETOOTH® LE) signals, NFC signals, LTE Direct signals, or a combination thereof, to determine the user location. The user location may be accurate enough to determine, for example, the section in which a user is located. However, in some situations, supplemental user location information may be used to determine, for example, the seat location of the user. For example, user device 320 may be limited in determining the user location, for example, when the user is in an indoor building or in an area with weak or no cellular signals. In these or other situations, service provider server 330 may obtain user location information from venue server 310 and/or third-party server 350 to supplement user location information available from user device 320. In this way, the user location may be determined with greater accuracy (e.g., a particular seat location at a venue may be determined) than may be determined using the user device alone for geotagging content to be stored in associated with the location A user can use a device such as a user device 320 to communicate with other users across time based on location by storing and/or receiving electronic content (sometimes referred to herein as a "time capsule") associated with the location. User device 320 may be a mobile device such as a cellular telephone, a tablet computer, a laptop computer, a wearable device, or another portable computing device. User device 320 may be a non-mobile device such as a desktop computer, an interactive set top box, or the like. User device 320 can be any device or combination of devices that facilitate online communication and social networking. User device 320 may, for example, be an implementation of client device 104 of FIG. 1.

User device 320 may include a processor 321, a memory 322, a GPS 323, a camera 324, a microphone 326, input/output components 328 (e.g., a keyboard, a touchscreen display, etc.) and/or other suitable device components. Processor 321 can execute an application such as an app 325 that facilitates methods for location-based communications across time as disclosed herein. App 325 can be stored in memory 322. App 325 can provide a graphical user interface (GUI) for the user when the user is transmitting and receiving communications. If desired, app 325 can be a dedicated communication and/or social networking app. However, this is merely illustrative. In some configurations, app 325 can be part of another app, such as a Paypal, Inc. payment provider app.

In various embodiments, user may create and/or capture content using camera 324, microphone 326, and/or input/output component 328. Camera 324 may be used by user to capture a photograph or record a video. Microphone 326 may be used to record a voice message or other sound recording. Input component 328, such as a keyboard or touchscreen, may be used by user to write a text message.

User device 320 can communicate with venue device 310, third-party server 350, and/or service provider server 330 via a network. For example, user device 320 can communicate with venue device 310, third-party server 350, and/or service provider server 330 via the Internet 340. User device 320 can communicate with the Internet via either a wired connection or a wireless connection.

Service provider server 330 may be operated by an online communications and social networking service provider. Service provider server 330 may also be operated by a ticket seller, such as STUBHUB®, Inc., online ticket seller and provide ticket fulfillment services, such as facilitating online ticket sales. In an embodiment, Service provider server 330 receives content (e.g., a text, a voice message, a photograph, an image, a video, or other content) from a first user. Service provider server 330 may also receive location and time information associated with the content. The location and time information may be included in the content based on geotagging and timestamping by user device 320. Service provider server 330 may associate the content with one or more locations, such as a section or a row at the venue, based on user selection and/or location information. Service provider server 330 may subsequently determine that a second user is located in a location corresponding to the location associated with the content. Service provider server 330 may provide access to the content to the second user while he or she in that location.

Service provider server 330 may include processing circuitry such as a processor 331 in communication with storage such as a memory 332. Processor 331 can include one or more processors. Processor 331 can access accounts such as a user account 333 and/or a venue account 334 that are stored in memory 332. User account 333 can include information regarding the user (e.g., identification information, preferences, account numbers, purchase history, social network contacts, email contacts, email account permissions, social media account permissions, event-related mementos, purchased-ticket event information, attended event information, etc.). Venue account 334 can include information regarding the venue (e.g., information regarding events, seating, venue location, and other venue features). Memory 332 can be separate from service provider server 330 and can be used to store any number of user accounts 333 and venue accounts 334. Memory 332 can be distributed, e.g., have portions thereof disposed at a plurality of different locations.

Service provider server 330 may include one or more servers located at one or more locations. Thus, service provider server 330 can be geographically and operationally distributed if desired. Service provider server 330 can be part of another system, such as a payment provider system. Venue device 310 and/or third-party server 350 can communicate with service provider server 330 over a wired or wireless connection such as via a network, such as Internet 340. Venue device 310 and/or third-party server 350 can communicate with a plurality of different service provider servers 330. Service provider server 330 can communicate with a plurality of different venue devices 310 and/or third-party servers 350. A plurality of different service provider servers 330 can communicate among themselves and can be considered herein as being the same as a single service provider server 330. The user can operate user device 320 to interact with service provider server 330 so that the user can communicate content information across time based on location online.

Service provider server 330 can communicate with venue device 310 to obtain information about the venue. For example, service provider server 330 can communicate with venue device 310 to obtain information regarding the scheduling of events at the venue and regarding features of the venue. The features of the venue can be dependent upon the events of the venue, e.g., the features of the venue can vary from event to event. Generally, venue device 310, mobile device 320, third-party server 350, and service provider server 330 can perform functions discussed herein. That is, at least to some extent, a function that is discussed herein as being performed via a particular one of these devices can be performed by a different one of these devices, by a combination of these devices, and/or by other devices.

Venue device 310, user device 320, third-party server 350, other mobile devices, and server 330 can communicate with one another via a network, such as the Internet 340 or with one another via one or more networks, such as local area networks (LANs), wide area networks (WANs), cellular telephone networks, and the like. Venue device 310, mobile devices such as user device 320, third-party server 350, server 330, and other devices can communicate with one another, at least partially, via one or more near field communications (NFC) methods or other short range communications methods, such as infrared (IR), BLUETOOTH® wireless technology, Wi-Fi, and WiMax.

When a user wishes to access content created by previous visitors, the user can open a service provider's website or can access the service provider using an application such as app 325. The user can open the service provider's website using user device 320, for example. The service provider's website can be hosted on service provider server 330, venue device 310, or on any other server or device.

Figure 4:
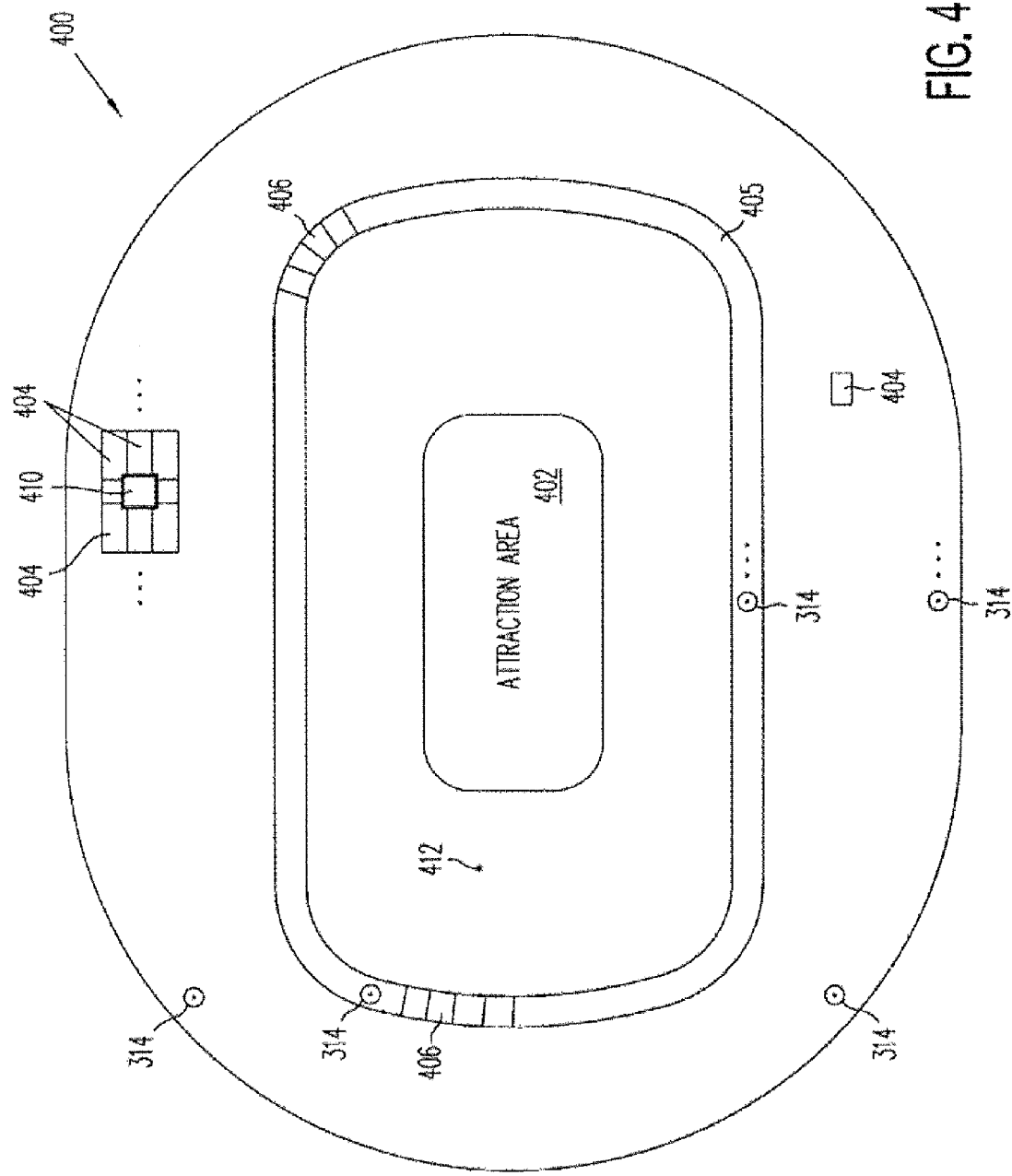
FIG. 4 is a diagram of an illustrative event venue showing an event attendee location and various other locations in the venue according to an embodiment.

FIG. 4 is a diagram of a venue 400 in accordance with an embodiment. In the example of FIG. 4, venue 400 may be a stadium, a theater, an arena, an amphitheater, a fairground, or another indoor or outdoor venue. Events such as sporting events, concerts, plays, performances, competitions, races, and/or other entertainment events may be held at venue 400.

As shown in FIG. 4, venue 400 may include an attraction area 402 and various locations for which a ticketholder may have purchased access such as seats 404, or other restricted access sections of venue 400 such as a general admission section, a standing room only section, a floor section, or the like. Attraction area 402 may be a court, a field, a stage, a track, a rink, or any other suitable portion of a venue at which events can be conducted. Venue 400 may include one or more concession areas such as concession stands 406 (e.g., a foodservice stand, a team memorabilia store, a drink stand, or other vendor stand). Concession stands 406 may be located in an aisle 405 or elsewhere in venue 400.

Venue 400 may include one or more communications systems such as a system of one or more wireless beacons 314. Beacons 314 may be disposed at any suitable location within venue 400. For example, a beacon may be located near concession stand 406, within or adjacent to each section of venue 400, within or adjacent to groups of sections within venue 400, or on or within each seat within venue 400.

A user of a system of the type described in connection with, for example, FIGS. 1 and/or 3 (e.g., an attendee of an event at venue 400) may have a ticket for a particular seat such as seat 410. However, the system may determine that the attendee is at a location such as user location 412 (sometimes referred to herein as an attendee location) that is the same as or different from the location of the user's seat 410 at any particular time during an event. User location 412 may be a current location of the event attendee or a time-averaged location of the event attendee (as examples).

User location 412 may be determined based on location information (e.g., GPS information, cellular signal information, Wi-Fi information, BLUETOOTH® Low Energy (BLUETOOTH® LE) information, NFC information, LTE Direct information, etc.) from user device 320 of the attendee and/or communication between user device 320 and one or more of wireless beacons 314. For example, when user device 320 is in communication with a particular one of beacons 314 for a period of time, user location 412 may be determined to be in proximity to that beacon 314

User location 412 may be determined to within an area corresponding to a section of venue 400, a group of seats of venue 400 (e.g., within 8 rows of seats, or within 25 seats), or a single seat 404.

The user may use user device 320 to create content to be stored in a virtual time capsule associated with a particular location (e.g., a location in or near venue 400). The user may communicate to a person in the future via the virtual time capsule so that the user is speaking across the "time lane" (i.e., across time). The content may be associated with the user's seat 410, a group of seats (e.g., within 5 seats of user's seat 410), user location 412, concession stand 406, a section where the user is located, and/or the whole of venue 400. For example, content that is related to the user's seat (e.g., a message saying "1 sat in your seat in 2014!") may be associated with seat 410, content that is created while the user is away from seat 410 (e.g., a video of the event from location 412) may be associated with user location 412, and content relating to concession stand 406 (e.g., "the hotdogs here taste bad") may be associated with the location of concession stand 406. In this way, the user may leave time capsules of content at various locations to be accessed by later visitors to those locations.

The user may be provided with content from earlier visitors to various locations at venue 400 based on a location of user device 320 as determined using an application such as app 325 (see FIG. 3). Location-based content that may be provided to a system user such as an event attendee using user device 320 of the attendee is described in further detail hereinafter in connection with, for example, FIG. 7. However, first various operations for storing and providing access to time capsule content stored in connection with various locations are described in connection with FIGS. 5 and 6.

Figure 5:
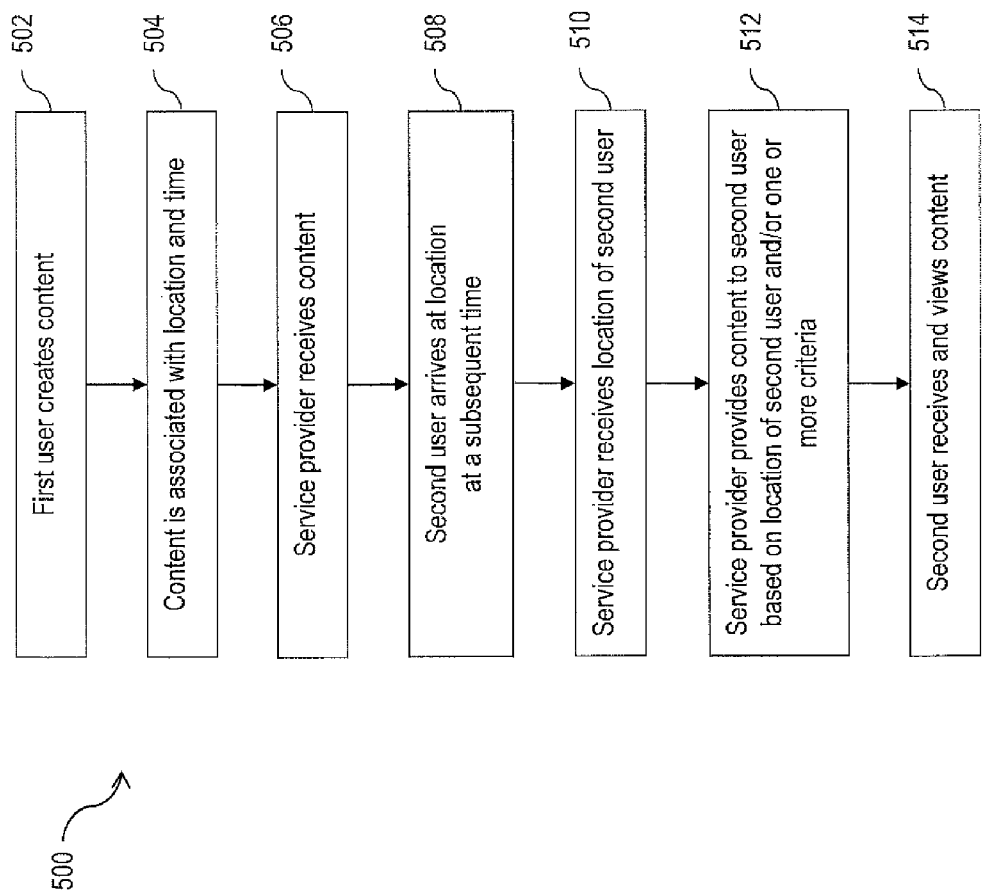
FIG. 5 is a flowchart showing an illustrative method for location-based communication across time according to an embodiment.

Referring now to FIG. 5, a flowchart of a method 500 for communications across time based on location is illustrated according to an embodiment of the present disclosure. A plurality of users may visit a location at various times. Earlier visitors to the location may create and store content to be accessed by later visitors to the location. Later visitors may view the stored content and may additionally create and store additional content to be accessed by even later visitors to the location. In this way, a database of content can be stored for various locations. The database creates a record of events at that location and stores communications for future visitors regarding the record of events.

At step 502, a first user arrives at the location and creates content using a first user device. The content may include a text-based message, an audio recording such as a voice message, an image, a photograph, a video, or other content. The first user device may be an implementation of user device 320. The first user, for example, decides to communicate the content to one or more unspecified future visitors.

At step 504, the content is associated with a location and a time. In an embodiment, the first user device associates a location with the content by geotagging the content with a user location determined using GPS such as GPS 323, cellular signals, Wi-Fi signals, BLUETOOTH® Low Energy (BLUETOOTH® LE) signals, NFC signals, LTE Direct signals, or a combination thereof (as examples). The first user device geotags the content by adding geographical information (e.g. latitude and longitude coordinates, an altitude, distance, accuracy data, place names, etc.) as metadata to the content. The location associated with the content may include one or more levels of specificity ranging from the whole venue (e.g., a stadium, a building, a city, a park, a lake, a pond, a campground, an amusement park, etc.) to a specific place at the venue (e.g., a section in a stadium, a seat in a stadium, or a room in a building).

In an embodiment, the first user device associates a time with the content by timestamping the content with the time. The first user device may timestamp the content by adding time information (e.g., a time at which the content was created, accessed, modified, saved, uploaded, or downloaded) as metadata to the content.

At step 506, a service provider server may receive the content. In various embodiments, service provider server 330 may, in response to receiving the content, store the content in a database, such as a storage module of service provider server 330.

In an embodiment, service provider server 330 receives the content together with the location and the time associated with the content from the first user device. In another embodiment, service provider server 330 receives the content and determines a location and a time to associate with the content. The time at which service provider server 330 receives the content may be associated with the content as a received time. Service provider server 330 may determine a seat number of the user at a venue and the seat number may be associated with the content as the location.

For example, service provider server 330 may receive the seat number from another source, such as third-party server 350 or venue server 310. Third-party server may determine a seat number by email scraping or social media account scraping (as examples), and venue server 310 may access seating information in its database for a location of the seat having the seat number. In another example, if service provider server 330 also performs ticket fulfillment services, it may access purchase history information in its database to determine a seat number of the user based on a ticket purchase by the user. In a further example, the seat number may be provided by the user.

At step 508, a second user arrives at or nearby the location associated with the content at a subsequent time.

At step 510, service provider server 330 receives a location of the second user from a second user device. The second user device may be an implementation of a user device such as user device 320. The second user device may determine a user location using GPS such as GPS 323, cellular signals, Wi-Fi signals, BLUETOOTH® Low Energy (BLUETOOTH® LE) signals, NFC signals, LTE Direct signals, or a combination thereof (as examples) and may provide the determined location to service provider server 330. Service provider server may compare the received second user location to the locations associated with various stored content. In an embodiment, a detection module of service provider server 330 detects a location of the second user device, such as by receiving location information from the second user device of the second user At step 512, when the second user is subsequently at or close to the location associated with the content, service provider server 330 may provide the content to the second user based on the location of the second user (e.g., based on the comparison of the location of the second user with the locations of the stored content) and/or one or more criteria, such as a search area criterion, a time interval criterion, an access area criterion, and/or a user interest criterion. For example, service provider server 330 may determine, based on the comparison, that the location of the second user (e.g., the location of the second user device) corresponds to the location associated with the stored content and provide the content to the second user device based on the determination that the location of the second user corresponds to the location associated with stored content. The second user may use the second user device to access and/or receive the content from service provider server 330.

In an embodiment, a determination module of service provider server 330 may determine that the location of the second user device corresponds to the location associated with the stored content and/or that one or more criteria are satisfied. A content access module of service provider server 330 may then provide the content to the second user device based on the determination that the location of the second user device corresponds to the location associated with stored content and that the one or more criteria are satisfied.

In various embodiments, the criteria may include a location-related criterion provided by the second user, such as a search area criterion. For example, the second user may provide a search area as a criterion so that content having an associated location within the search area satisfies the criterion. In an example, the second user may provide a broad search area that includes the whole venue (e.g., a stadium or building) in which the second user is located, or a narrow search area that includes a part of the venue (e.g., a section or a floor) in which the second user is located. In another example, the second user may provide a search area such as content having an associated location within a user specified distance (e.g., one foot, two feet, five feet, six feet, ten feet, ten yards, one mile, etc.) from the location of the second user.

In other embodiments, the criteria may include a time-related criterion provided by the second user, such as a time interval criterion. For example, the second user may provide a time interval as a criterion such that content having an associated time within the time interval satisfies the criterion. In an example, the second user may provide a certain time interval to service provider server 330. Service provider server 330 may provide content having an associated time within the provided time interval. In another example, a second user may desire to view content stored for the location between 2012 and 2014 or during the 2007 football season (as examples).

In further embodiments, the criteria may include a location-related criterion provided by the first user, such as an access area criterion. For example, the first user may provide an access area in which the content is accessible such that only future visitors who are located within the access area are able to access the content. In an example, service provider server 330 may provide the first user with a list of areas that encompass the location of the first user (e.g., a seat, a row, a section, an area within a particular radius, etc.), and the first user may select on or more access areas. In another example, the first user may specify the access area, for example, by drawing on a map of the venue. One or more access areas may be associated with the content.

The access area may include a whole venue (e.g., a stadium, a building, etc.) or a part of a venue (e.g., a section or seat in a stadium, a room in a building, etc.). Service provider server 330 may provide access to the content when the second user is within the access area. For example, if the first user selects a broad area (e.g., a stadium, building, etc.), the second user may be anywhere within the broad area and be able to access the content information. If the first user selects a relatively smaller area (e.g., a seat in a stadium, a room in a building, etc.), the second user is able to access the content information only when he or she is within the relatively smaller area.

The access area may include a distance range centered on a location. For example, the first user may select a range of 10 feet such that the access area is a circle with a radius of 10 feet of the location of the first user.

In some embodiments, the criteria may include a location-related criterion determined by service provider server 330. Service provider server 330 may determine an access area in which the content is accessible such that only second users or any later users who are located within the access area are able to access the content. For example, service provider server 330 may determine an access area to be each venue (e.g., a stadium, theater, building, etc.) such that only users within the venue are able to access content associated with the venue. If the second user is outside a venue, he or she may be prevented from accessing content associated with a location within the venue. Thus, only users who likely have a shared interest or connection (as indicated by both users visiting the same location) may view the content.

In another example, service provider server 330 may provide access only to content associated with a venue to users within the venue. Service provider server 330 may accomplish this by limiting the search area to the venue for the second user. Thus, if the second user provides a search area that is too wide, such as 50 yards in a small restaurant, only content associated with locations within the venue may be provided and not the content associated with a venue next door. Service provider server may apply various limitations and restrictions for access areas and search areas for each venue, and the limitations may depend on the type of venue (e.g., public vs. private).

In various embodiments, the criteria may include a criterion based on information about the first user and the second user, such as a user interest criterion that is based on interests of the users. The criterion based on user interest may be provided by service provider server 330. For example, the user interest criteria may be based on a shared interest of the first user and the second user, or relate to dissimilar interests of the first user and the second user. User interest and other information of the first and second user may be determined and/or received by service provider server 330. Service provider server 330 may determine user interest by accessing each user's user device or third party server 350. For example, service provider server 330 may access each user's search history, purchase history, social networks, self-entered interest, etc.

In an embodiment, service provider server 330 may provide a criterion of shared interest related to the venue and/or the event. For example, service provider server 330 may provide a shared interest criterion at a sports stadium such that only content of users who are a fan of the same sports team satisfy the criterion. If the second user is a fan of a certain team, he or she may access content of the first user only if the first user is also a fan of the certain team.

In another embodiment, service provider server 330 may provide a criterion of shared interest independent of the venue and/or the event. For example, service provider server 330 may provide a shared interest criterion at a sports stadium such that only content of users who have a shared interest other than sports, for example wine, satisfy the criterion. If the second user is interested in wine, he or she may access content of the first user only if the first user is also interested in wine. Providing a shared interest criterion unrelated to the venue/event may be advantageous because the first user and the second user likely share at least two interests, one related to the venue/event and one independent of the venue/event.

In a further embodiment, service provider server 330 may provide a criterion of dissimilar interest related to the venue and/or the event. For example, service provider server 330 may provide a dissimilar interest criterion at a sports stadium such that content of users who are a fan of a rival sports team do not satisfy the criteria and are excluded. If the second user is a fan of a certain team, he or she may be prevented from accessing content provided by the first user if the first user is a fan of a rival team. Providing a dissimilar interest criterion may be advantageous in certain situations. For example, at sports stadiums with rivalries among fans of rival teams, providing for communications between fans of rival teams may be disruptive, especially when fans get heated up by the game, and preventing such communications may provide a more positive user experience.

At step 514, the second user receives the content from service provider server 330. The second user may view the received content on the second user device. In an embodiment, the content access module of service provider server 330 may transmit the content to the second user device. In some embodiments, the second user may respond to the first user by storing second content on service provider server 330 as a response. The second stored content and the content stored by the first user may later be accessed by a third user, a fourth user, or any other user who visits the location. Each user who visits the location may also be provided with the ability to respond directly or by storing additional content to any previous user who has stored content associated with that location. In this way, communication between users across time based on location may be provided.

Figure 6:
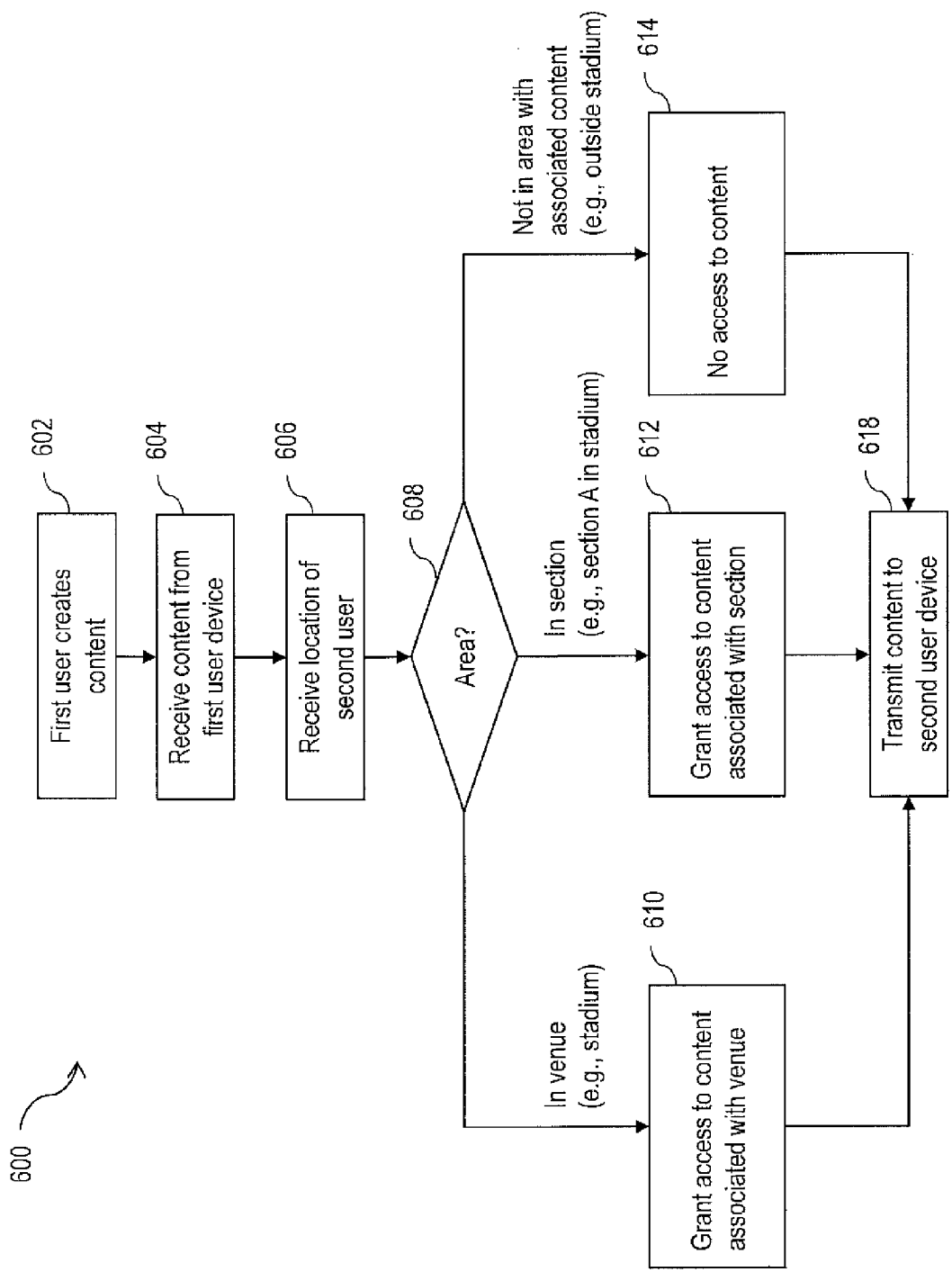
FIG. 6 is a flowchart showing an illustrative method that may be performed by a service provider to grant access to content based on location according to an embodiment.

Referring now to FIG. 6, a flowchart showing a method that may be performed by, for example, service provider server 330 to grant access to content based on a location is illustrated according to an embodiment of the present disclosure.

At block 602, a first user creates content (e.g., a text, a voice message, a photograph, an image, a video, or other content) and decides to communicate the content to future visitors of the location.

At block 604, service provider server 330 receives the content from a first user device. The content may include a location and a time associated with the content and/or service provider server 330 may determine a location and a time associated with the content. The service provider may store the received content along with the associated location and time of the content.

At block 606, service provider server 330 receives a location of a second user from a second user device. The second user device may determine user location using GPS, cellular signals, Wi-Fi signals, BLUETOOTH® Low Energy (BLUETOOTH® LE) signals, NFC signals, LTE Direct signals, or a combination thereof.

At block 608, service provider server 330 may determine whether the second user is in an access area in which the content is accessible. The access area in which the content is accessible may be provided by the first user or determined by service provider server 330, as, for example, described above in connection with step 512 of FIG. 5.

At block 610, if the second user is in an access area that is a venue (e.g., a structure such as a stadium or a building), service provider server 330 grants access to content having an access area of the venue. The content having the access area of the venue may be content associated with the venue.

At block 612, if the second user is in an access area that is a section within the venue, service provider server 330 grants access to content having an access area of that section. The content having the access area of the section may be content associated with the section.

At block 614, if the second user is not in an access area with associated content, such as an area outside the venue with no stored content or at a venue with no stored content, service provider server 330 does not grant access to content.

At block 618, service provider server 330 may transmit or otherwise provide the accessible content to the second user device at the request of the second user.

Figure 7:
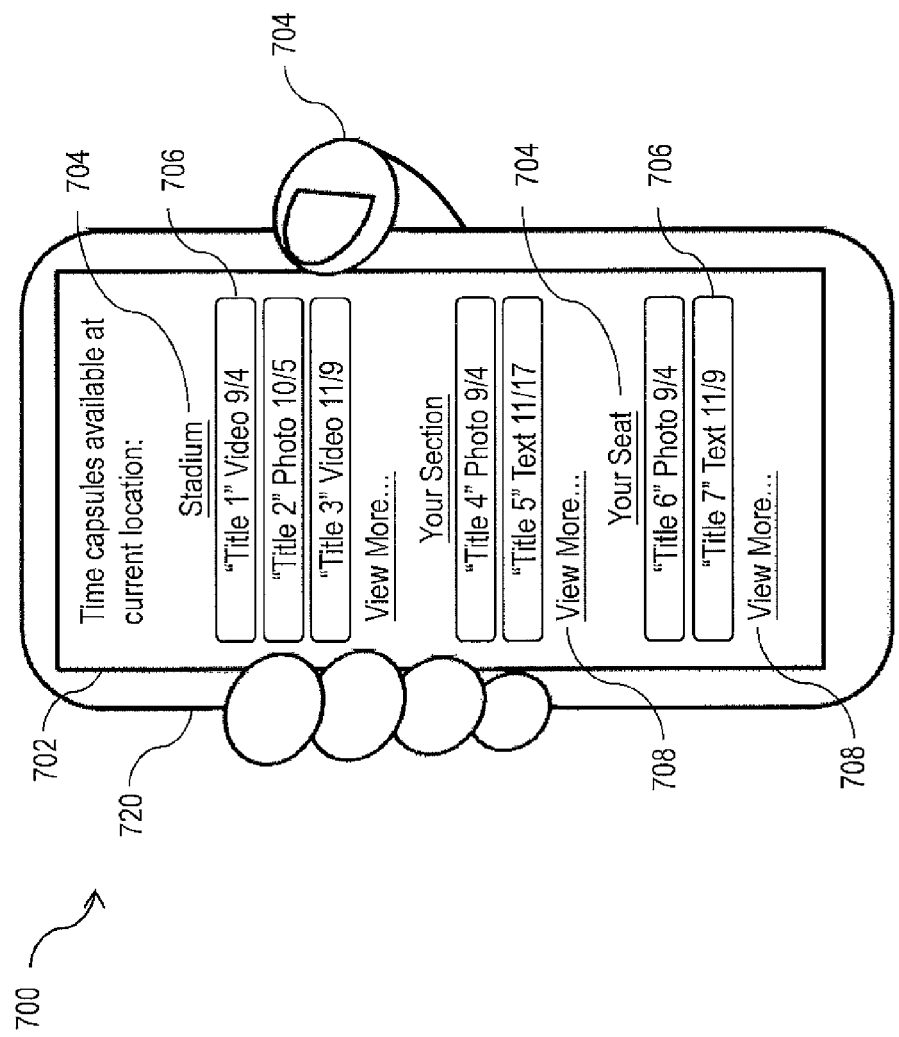
FIG. 7 is a diagram illustrative of a screen providing access to content based on location on a user device according to an embodiment.

Referring now to FIG. 7, a diagram of a user device 700 having a case 720 and a display 702 that is being used to provide access to location-based communications across time is illustrated according to an embodiment. In the example of FIG. 7, device 700 is a handheld device capable of being held in a hand such as hand 704 of a user.

In an embodiment, one or more first users create content at a venue such as a stadium and associate the content with an access area, such as the stadium, a section, or a seat within the stadium or a location outside the stadium such as a parking spot or a park. The first users store the content on service provider server 330 as a "time capsule." When a second user, third user, or other subsequent user arrives at a location at the stadium, the second user may receive content stored by the first users by, for example, interacting with displayed content choices associated with the subsequent user's location shown in display 702 (e.g., by clicking virtual buttons 706 on the display). A list of available content may be provided to display the content choices at the subsequent user's location. Each button 706 may be generated to represent distinct content stored by the first users and may contain a title, the type of content (e.g., text, photo, video, etc.), and the date it was created. The content represented by each of buttons 706 may have an associated access area, so each button 706 may be listed under an associated access area heading 704. Buttons 706 and their associated content may be provided on display 702 only when the second user is within the access area associated with the content.

In the example of FIG. 7, buttons 706 that represent content with an access area of the whole stadium are listed under heading 704 of "Stadium", buttons 706 that represent content with an access area of the section in which the second user is located are listed under the heading 704 of "Your Section", and buttons 706 that represent content with an access area of the seat in which the second user is sitting are listed under the heading 704 of "Your Seat". The second user may be provided with a selectable "View More" link 708 that, when selected, provides the second user with more content associated with the access area heading 704 associated with that "View More" link.

In some embodiments, service provider server 330 may determine a specific seat in which the first user or second user is sitting based on accessing its own database, or receiving information from third-party server 350 or venue server 310. For example, if service provider server 330 provides services such as ticket fulfillment services, service provider server 330 may access ticket sales history to determine which seat the user purchased. In another example, service provider server 330 may receive user location information from venue server 310 based on wireless beacons 314. In another example, service provider server 330 may receive seating information for an event at the venue from third-party server 370 based on email scrapping.

Many of the examples described herein in connection with storing content associated with a location have been described in the context of event venues such as a stadium. However, this is merely illustrative. It should be appreciated that users may store location content (e.g., time capsules) at any suitable location that may later be visited by another user. As one example, users may store location content at or within an outdoor area or at or within a building such as building 800 of FIG. 8.

Figure 8:
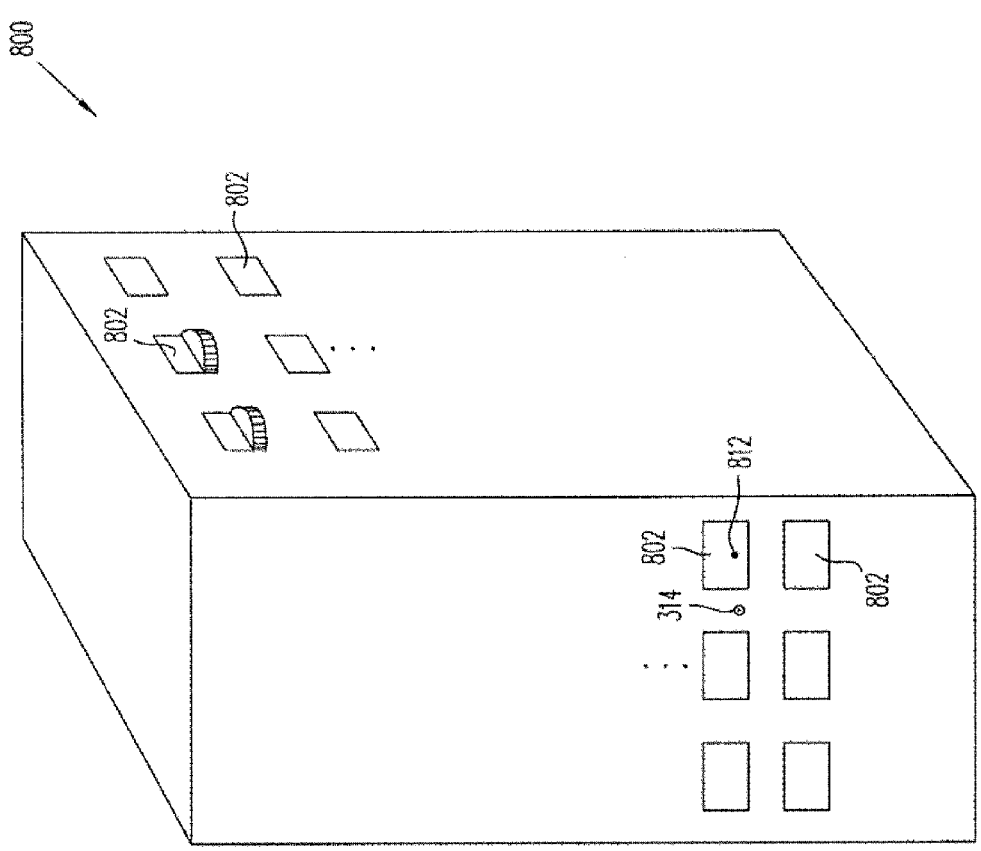
FIG. 8 is a diagram of an illustrative building showing a user location and various other locations in the building according to an embodiment.

FIG. 8 shows a portion of a building 800 (e.g., a hotel, an office building, a museum, a library, a shopping center, a fitness center, an airport, etc.), according to an embodiment. For example, building 800 may have rooms 802.

A visitor of building 800 may be located at a location 812 such as a location in one of rooms 802. The visitor may store and/or access content based on the user's location 812 as described herein. For example, a user may check into a hotel room 802 and, upon entry into the hotel room, be provided with messages, pictures, and/or other content provided by previous occupants of the hotel room. The user may provide additional messages, photos, or other content to be stored for future visitors and/or to be provided to the past visitors that have previously stored content.

While at the building 800, the locations of various visitors may be tracked. For example, location 812 may be determined using one or more wireless beacons 314 located in or near the building and in communication with user device 320 of the visitor and/or using GPS coordinates from user device 320 of the visitor. For example, when GPS coordinates from user device 320 are not able to determine which floor the visitor is located on within the building, service provider server 330 may receive user location information based on communications between the visitor's device and beacons 812 from venue server 310. The visitor may then send content to service provider server 330 that is associated with the determined user location and access content stored by previous visitors of the determined location.

In some embodiments, the user may be located on or within a moving structure such as a train, an airplane, a bus, or a cruise ship. In these embodiments, the location associated with the stored content may be a combined location including a location on or within the structure and the location of the moving structure. For example, a traveler staying in a particular room on a cruise ship may capture an image of a particular geographical feature such as a glacier from the window in that room when the ship is within view of the geographical feature. The user may provide the image for storage for future guests in that particular room. However, the image of the geographical feature may only be provided to the future guests when the ship is again in view of that geographical feature.

Figure 9:
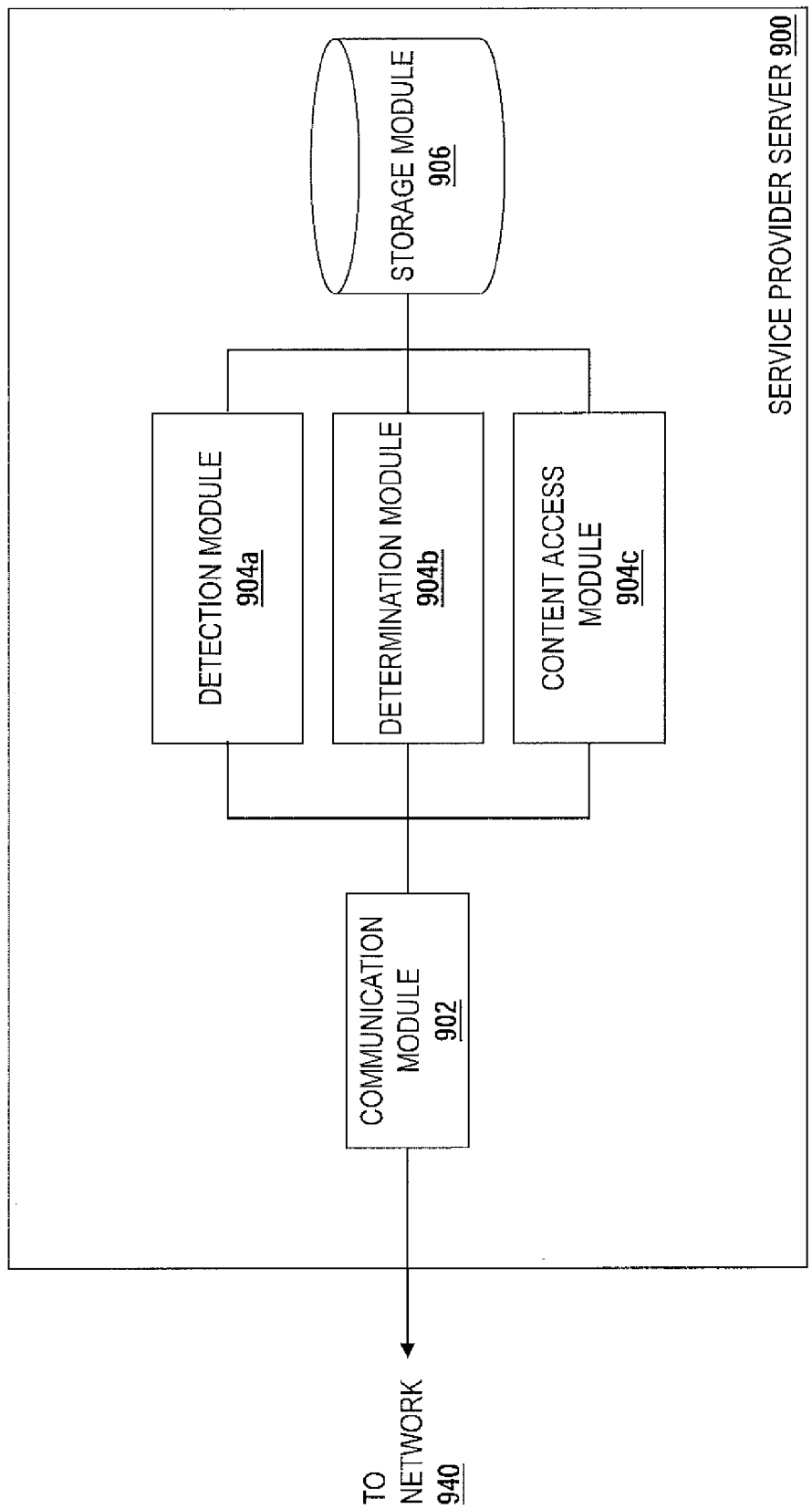
FIG. 9 is a block diagram of an illustrative service provider server that is adapted to provide services for location-based communication across time according to an embodiment.

Referring now to FIG. 9, an embodiment of a service provider server or device 900 is illustrated. Service provider server 900 includes a communication module 902 that is coupled to a network 940, such as Internet 340, and to any or all of a detection module 904a, a determination module 904b, and a content access module 904c, any of which may be coupled to a database or other non-transitory memory, such as storage module 906. Any or all of modules 902 and 904a-c may be implemented as a subsystem of system provider server 900 including, for example, a circuit, a hardware component, a hardware subcomponent, and/or a variety of other subsystems known in the art. Furthermore, any or all of modules 902 and 904a-c may be preconfigured to perform their disclosed functionality, or may be configured by a processing system "on-the-fly" or as needed to perform their disclosed functionality. As such, any or all of modules 902 and 904a-c may include pre-configured and dedicated circuits and/or hardware components of system provider server 900, or may be circuits and/or hardware components that are configured as needed.

For example, any or all of modules 902 and 904a-c may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause modules 902, 904a, 904b, and/or 904c to perform the functions described above. As such, in some embodiments, pre-configured and dedicated circuits may be implemented to perform the functions of modules 902, 904a, 904b, and/or 904c. In other embodiments, a processing system may execute instructions on a non-transitory, computer-readable medium to configure one or more circuits as needed to perform the functions of modules 902, 904a, 904b, and/or 904c.

Communication module 902 may be included as a separate module provided in service provider server 900, or may be provided using instructions stored on a computer-readable medium that, when executed by a processing system in service provider server 900, configure communication module 902 to send and receive information over network 940, as well as provide any of the other functionality that is discussed above.

Storage module 906 may store content associated with a first location in response to receiving the content from a first user device of a first user, as well as store any other content that is discussed above.

Detection module 904a may be included as a separate module provided in service provider server 900, or may be provided using instructions stored on a computer-readable medium that, when executed by a processing system in service provider server 900, configure detection module 904a to detect that a second user device of a second user is located at a second location, as well as provide any of the other functionality that is discussed above. In an embodiment, detection module 904a detects the first location and/or the second location based on a communication between a wireless beacon at a venue and the first user device and/or the second user device. In another embodiment, the first location may be a seat location of the first user and/or the second location may be a seat location of the second user, and the detection module 904a determines the first location and/or the second location based on scraping an email account of the first user and/or the second user.

Determination module 904b may be included as a separate module provided in service provider server 900, or may be provided using instructions stored on a computer-readable medium that, when executed by a processing system in service provider server 900, configure determination module 904b to determine that the second location corresponds to the first location and/or that one or more criteria are satisfied, as well as provide any of the other functionality discussed above. The one or more criteria may include, for example, a search area criterion, a time interval criterion, an access area criterion, and/or a user interest criterion.

Content access module 904c may be included as a separate module provided in service provider server 900, or may be provided using instructions stored on a computer-readable medium that, when executed by a processing system in service provider server 900, configure content access module 904c to provide the content to the second user device over network 940 based on the determination that the second location corresponds to the first location and that the one or more criteria are satisfied, as well as provide any of the other functionality discussed above. Content access module 904c may also provide a list of available content associated with the second location at a venue to the second user device, which may be displayed as a list of buttons 706 as illustrated in FIG. 7.

In an embodiment, determination module 904b may determine, in response to receiving a time interval from the second user device, whether the time is within the time interval. Content access module 904c may provide the content to the second user device based on the determination that the second location corresponds to the first location and based on the determination of whether the time is within the time interval.

In another embodiment, determination module 904b may determine, in response to receiving a search area from the second user device, whether the first location is within the search area. Content access module 904c may provide the content to the second user device based on the determination that the second location corresponds to the first location and based on the determination of whether the first location is within the search area.

In a further embodiment, determination module 904b may determine, in response to receiving an access area from the first user device, whether the second location is within the access area. Content access module 904c may provide the content to the second user device based on the determination that the second location corresponds to the first location and based on the determination of whether the second location is within the access area.

In some embodiment, determination module 904b may determine user interests of the first user and the second user, and determine whether the first user and the second user have a shared interest. Content access module 904c may provide the content to the second user device based on the determination that the second location corresponds to the first location and based on the determination of whether the first user and the second user have the shared interest.

In various embodiments, storage module 906 may store second content associated with the second location in response to receiving the second content from the second user device. Content access module 904c may provide the second content to the first user device or a third user device. For example, determination module 904b may determine, in response to receiving a third location of a third user device, that the third location corresponds to the first location or the second location and that the one or more criteria are satisfied, and content access module 904c may provide the second content to the third user device based on the determination that the third location corresponds to the first location or the second location and the satisfaction of the one or more criteria.

Other modules not illustrated in FIG. 9 may be provided as separate modules on service provider server 900, or using instructions stored on a computer-readable medium, to provide any of the other functionality discussed above. While storage module 906 has been illustrated as located in service provider server 900, one of skill in the art will recognize that it may include multiple storage modules and may be connected to modules 904a-c through network 940 without departing from the scope of the present disclosure.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system comprising:
a storage device configured to store a plurality of content each associated with a respective location; and
one or more hardware processors in communication with the storage device and configured to:
receive content and a first location from a first user device, wherein the first location is determined by the first user device;
in response to receiving the content and the first location, associating the content with the first location;
receive an access area comprising the first location from the first user device;
receive a second location from a second user device, wherein the second location is determined by the second user device;
in response to receiving the second location, determine the second user device is within the access area; and provide access to the content to the second user device over a network based on determining the second user device is within the access area and only while the second user device is within the access area.

2. The system of claim 1, wherein the content is geotagged content from the first user device.

3. The system of claim 1, wherein the content is further associated with a time.

4. The system of claim 3, wherein the content is timestamped content from the first user device.

5. The system of claim 3, wherein the one or more hardware processors are further configured to:
receive one or more criteria comprising a time interval from the second user device;
in response to receiving the one or more criteria, determine the time is within the time interval; and
provide access to the content to the second user device further based on determining the time is within the time interval.

6. The system of claim 1, wherein the one or more criteria further comprises a search area, and wherein the one or more hardware processors are further configured to:
in response to receiving the one or more criteria, determine the first location is within the search area; and
provide the content to the second user device further based on the determining the first location is within the search area.

7. The system of claim 1, wherein the one or more hardware processors are configured to:
determine user interests of a first user associated with the first user device;
determine a user interest of a second user associated with the second user device;
determine the first user and the second user have a shared interest; and
provide the content to the second user device further based on determining the first user and the second user have the shared interest.

8. The system of claim 1, wherein the first location or the second location is detected based on a communication between a wireless beacon at a venue and the first user device or the second user device.

9. The system of claim 1, wherein the first location is a seat location of a first user or the second location is a seat location of a second user, and wherein the first location or the second location is determined based on scraping an email account.

10. The system of claim 1, wherein the one or more hardware processors are configured to provide access to the content by providing a list of available content comprising the content, wherein the second location is within a respective access area of the available content.

11. The system of claim 1, wherein the one or more hardware processors are further configured to:
receive second content from the second user device; and
provide the second content to the first user device in real-time or when the first user device returns to the first location.

12. A method, comprising:
receiving, by a processing system over a network through a network interface, content from a first user device, wherein the content is associated with a first location determined by the first user device;
in response to the receiving the content, storing, by the processing system in a non-transitory memory system, the content;
receiving, by the processing system, an access area comprising the first location from the first user device;
receiving, by the processing system over the network through the network interface, a second location from a second user device, the second location determined by the second device;
in response to the receiving the second location, determining the second user device is within the access area; and
providing, by the processing system over the network through the network interface, the content to the second user device based on the determining the second user device is within the access area and only while the second user device is within the access area.

13. The method of claim 12, wherein the content is further associated with a time.

14. The method of claim 13, wherein the providing is further based on one or more criteria comprising a search area criterion, a time interval criterion, a user interest criterion, or a combination thereof.

15. The method of claim 12, further comprising:
receiving, by the processing system over the network through the network interface, second content from the second user device, wherein the second content is associated with the second location; and
providing, by the processing system over the network through the network interface, the second content to the first user device or a third user device.

16. A non-transitory machine-readable medium having stored thereon a plurality of machine-readable instructions executable to cause a machine to perform operations comprising:
receiving content from a first user device, the content associated with a first location determined by the first device;
in response to the receiving the content, storing the content;
receiving an access area comprising the first location from the first user device;
receiving a second location from a second user device, the second location determined by the second user device;
determining the second user device is within the access area;
in response to the receiving the second location, the second user device is within the access area; and
providing the content to the second user device based on the determining the second user device is within the access area and only while the second user device is within the access area.

17. The non-transitory machine-readable medium of claim 16, wherein the content is geotagged and timestamped content from the first user device.

18. The non-transitory machine-readable medium of claim 17, wherein the providing is further based on one or more criteria comprising a search area criterion, a time interval criterion, a user interest criterion, or a combination thereof.

19. The non-transitory machine-readable medium of claim 16, wherein the operations further comprise:
receiving second content associated with the second location from the second user device;
in response to the receiving the second content, storing second content in the database; and
providing the second content to the first user device;
receiving a third location from a third user device, the third location determined by the third user device;
in response to the receiving the third location, determine the third location is within the access area of the content or is within an access area of the second content; and
providing the content or the second content to the third user device based on the determining the third location is within the access area of the content or the second content.

* * * * *